United States Patent
Yun

(10) Patent No.: US 8,462,011 B2
(45) Date of Patent: Jun. 11, 2013

(54) REMOTE CONTROL FOR SENSING MOVEMENT, IMAGE DISPLAY APPARATUS FOR CONTROLLING POINTER BY THE REMOTE CONTROL, AND CONTROLLING METHOD THEREOF

(75) Inventor: Hyun-kyu Yun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1264 days.

(21) Appl. No.: 12/048,761

(22) Filed: Mar. 14, 2008

(65) Prior Publication Data

US 2009/0072992 A1 Mar. 19, 2009

(30) Foreign Application Priority Data

Sep. 19, 2007 (KR) ................... 10-2007-0095535

(51) Int. Cl.
| | |
|---|---|
| G08B 5/00 | (2006.01) |
| G08B 5/24 | (2006.01) |
| G05B 11/01 | (2006.01) |
| G09G 5/08 | (2006.01) |
| G09G 5/00 | (2006.01) |
| H04B 1/06 | (2006.01) |
| H04L 29/08 | (2006.01) |
| G06F 3/048 | (2006.01) |
| G06F 3/033 | (2006.01) |

(52) U.S. Cl.
USPC ............... 340/815.6; 340/815.78; 340/12.22; 345/158; 345/156; 345/169; 455/352; 455/414.4; 715/856; 715/863

(58) Field of Classification Search
USPC ............. 340/825.22, 825.25, 825.69, 825.24, 340/825.71, 825.72, 10.2, 10.3, 10.32, 10.1, 340/340/572.1, 572.2, 572.4, 10.4, 10.42, 340/10.51, 10.52, 10.41, 539.13, 870.11, 340/825.73, 7.21, 572, 505, 825.54, 825.34, 340/825.31, 825.49, 572.7, 12.22, 4.11, 825.63, 340/.1; 455/4, 5, 6, 151, 352, 414.4; 358/194.1, 358/188; 345/156–184, 419; 715/856, 863
See application file for complete search history.

(56) References Cited

U.S. PATENT DOCUMENTS

| | | | | |
|---|---|---|---|---|
| 6,081,255 | A * | 6/2000 | Narabu | 345/158 |
| 7,301,529 | B2 * | 11/2007 | Marvit et al. | 345/156 |
| 7,737,965 | B2 * | 6/2010 | Alter et al. | 345/419 |
| 2003/0142065 | A1 | 7/2003 | Pahlavan | |
| 2005/0212767 | A1 | 9/2005 | Marvit et al. | |
| 2005/0225453 | A1 * | 10/2005 | Chang et al. | 340/825.69 |

(Continued)

FOREIGN PATENT DOCUMENTS

| | | |
|---|---|---|
| JP | 2003-333360 A | 11/2003 |
| JP | 2005-12433 A | 1/2005 |

(Continued)

OTHER PUBLICATIONS

Extended European Search Report issued on May 19, 2010 in counterpart European Application No. 08162374.6.

(Continued)

*Primary Examiner* — Jennifer Mehmood
*Assistant Examiner* — Mirza Alam
(74) *Attorney, Agent, or Firm* — Sughrue Mion, PLLC

(57) ABSTRACT

A remote control is provided including a plurality of sensors which sense movement of the remote control, and a control unit which turns on at least one sensor of the plurality of sensors and thereby senses movement of the remote control, and determines whether to turn on or off the remaining sensors according to whether or not the at least one sensor senses movement of the remote control. Consequently, battery consumption is reduced.

22 Claims, 5 Drawing Sheets

U.S. PATENT DOCUMENTS

| | | |
|---|---|---|
| 2006/0150215 A1* | 7/2006 | Wroblewski .................... 725/47 |
| 2006/0161377 A1* | 7/2006 | Rakkola et al. ............... 702/141 |
| 2007/0054651 A1* | 3/2007 | Farmer et al. ................. 455/352 |
| 2007/0185968 A1* | 8/2007 | White et al. .................. 709/208 |
| 2007/0265104 A1* | 11/2007 | Haga et al. ..................... 473/37 |
| 2009/0325557 A1* | 12/2009 | Wada ........................ 455/414.4 |

FOREIGN PATENT DOCUMENTS

| | | |
|---|---|---|
| KR | 10-2004-0077349 A | 9/2004 |
| KR | 10-2005-0080264 A | 8/2005 |
| KR | 10-2007-0058348 A | 6/2007 |
| WO | 2006/073654 A2 | 7/2006 |

OTHER PUBLICATIONS

Communication dated Dec. 28, 2011, issued by the Korean Intellectual Property Office in counterpart Korean Application No. 10-2007-0095535.

* cited by examiner

REMOTE CONTROL FOR SENSING MOVEMENT, IMAGE DISPLAY APPARATUS FOR CONTROLLING POINTER BY THE REMOTE CONTROL, AND CONTROLLING METHOD THEREOF

CROSS-REFERENCE TO RELATED APPLICATIONS

This application claims priority under 35 U.S.C. §119 from Korean Patent Application No. 10-2007-0095535, filed on Sep. 19, 2007, in the Korean Intellectual Property Office, the disclosure of which is incorporated herein by reference in its entirety.

BACKGROUND OF THE INVENTION

1. Field of the Invention

Apparatuses and methods consistent with the present invention relate to providing a remote control for sensing its movement, an image display apparatus for controlling a pointer using the remote control, and a controlling method thereof, and more particularly, to providing a remote control which determines whether to turn on/off other sensors using one of a plurality of sensors mounted in the remote control, and transmits a signal output from the sensor to an image display apparatus without applying the signal to an algorithm, and the image display apparatus which determines the position of a pointer using the signal transmitted from the remote control, and a controlling method thereof.

2. Description of the Related Art

Digital televisions output diverse broadcast signals, such as text and data, in addition to images, on displays, and have various functions absent from conventional televisions, and various options to display broadcast signals in an optimal way. Accordingly, digital televisions provide users with a graphical user interface (GUI) environment, for example, an on-screen display (OSD), so that the users can change settings of the digital television.

In general, the user changes settings using a remote control. The user presses buttons provided on the remote control in order for the setting information of the image display apparatus to be displayed.

However, it is inconvenient for the user to press buttons one by one to display the setting information. In addition, such inconvenience increases when there are many buttons provided on the remote control. Accordingly, users prefer more convenient manipulation when using the GUI, so recently a method for controlling the image display apparatus using a remote control adopting a remote pointing operation has been developed.

The remote pointing operation consists of a pointer being displayed on the image display apparatus and moving in association with the movement of the remote control, so the user can easily select menus displayed on the image display apparatus.

A remote control adopting the remote pointing operation needs to include a plurality of sensors for sensing movement of the remote control, and a calculation unit for calculating motion vectors for signals output from the sensors.

However, such a remote control adopting the remote pointing operation has the shortcoming of increased battery consumption over general remote controls. Moreover, the plurality of sensors need to remain turned on, leading to high battery consumption. As a result, user convenience is reduced.

Therefore, there is a need for a remote control system in which battery consumption is reduced.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

The present invention provides a remote control which determines whether to turn on/off a plurality of sensors mounted in the remote control using one of the sensors, and transmits a signal output from the sensor to an image display apparatus without applying the signal to an algorithm so that battery consumption is reduced, and the image display apparatus which determines the position of a pointer using the signal transmitted from the remote control, and a controlling method thereof.

According to an exemplary aspect of the present invention, there is provided a remote control including a plurality of sensors which sense movement of the remote control, and a control unit which turns on at least one sensor of the plurality of sensors and thereby senses movement of the remote control, and determines whether to turn on or off the remaining sensors according to whether or not the at least one sensor senses movement of the remote control.

The control unit may turn on the remaining sensors if a signal level output from the at least one sensor is higher than a reference signal level.

The remote control may further include an analog to digital converter (ADC) which converts analog signals output from the sensors into digital signals, and a transmission unit which converts the converted digital signals into transmittable signals and transmits the transmittable signals.

The sensors may include gyro sensors, acceleration sensors, and terrestrial magnetism sensors.

According to another exemplary aspect of the present invention, there is provided an image display apparatus including a reception unit which receives a signal corresponding to movement of the remote control from the remote control, a calculation unit which calculates a motion vector of the remote control using the received signal, and a control unit which applies the calculated motion vector to coordinates of a pointer displayed on a display and thereby moves the location of the pointer.

According to another exemplary aspect of the present invention, there is provided a method for controlling a remote control including a plurality of sensors for sensing movement of the remote control in order to control an external device, the method including turning on at least one sensor of the plurality of sensors and thereby sensing movement of the remote control, and determining whether to turn on or off the remaining sensors according to whether or not the at least one sensor senses movement of the remote control.

In the determination, the remaining sensors may be turned on if a signal level output from the at least one sensor is higher than a reference signal level.

The method may further include converting analog signals output from the plurality of sensors into digital signals if the plurality of sensors are turned on, and converting the converted digital signals into transmittable signals and transmitting the transmittable signal to the external device.

The sensors may include gyro sensors, acceleration sensors, and terrestrial magnetism sensors.

According to another exemplary aspect of the present invention, there is provided a method of controlling a display using a pointer in an image display apparatus, the method including receiving a signal corresponding to movement of a remote control from the remote control, calculating a motion vector of the remote control using the received signal, and applying the calculated motion vector to coordinates of a pointer displayed on a display and thereby moving the location of the pointer.

According to another exemplary aspect of the present invention, there is provided an image display system including an image display apparatus and a remote control. The remote control may include a plurality of sensors which sense movement of the remote control, a control unit which turns on at least one sensor of the plurality of sensors and thereby senses movement of the remote control and determines whether to turn on or off the remaining sensors according to whether or not the at least one sensor senses movement of the remote control, an analog to digital converter (ADC) which converts analog signals output from the sensors into digital signals, and a transmission unit which converts the converted digital signals into transmittable signals and transmits the transmittable signals. The image display apparatus may include a display, a reception unit which receives the signals from the remote control, and a control unit which converts the received signals into displayable signals and displays the converted signals on the display.

According to another exemplary aspect of the present invention, there is provided a method of controlling an image display system including an image display apparatus and a remote control, which includes a plurality of sensors, the method including turning on at least one sensor of the plurality of sensors and thereby sensing movement of the remote control, determining whether to turn on or off the remaining sensors according to whether or not the at least one sensor senses movement of the remote control, converting analog signals output from the plurality of sensors into digital signals if the plurality of sensors are turned on, converting the converted digital signals into transmittable signals and transmitting the transmittable signals to the image display apparatus, and receiving the transmitted signals, converting the received signals into displayable signals and displaying the converted signals.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF EXEMPLARY EMBODIMENTS OF THE INVENTION

Figure 1:
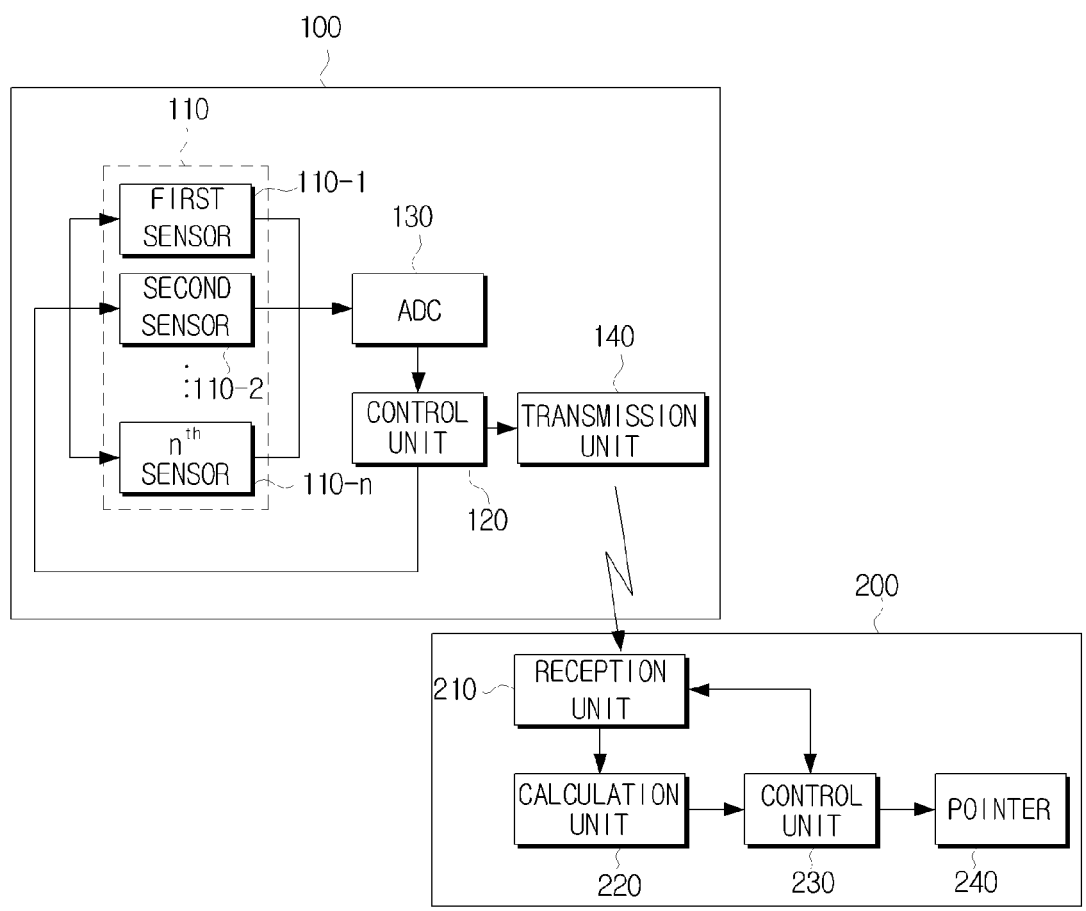
FIG. 1 is a block diagram of a remote control and an image display apparatus according to an exemplary embodiment of the present invention.

Certain exemplary embodiments of the present invention will now be described in greater detail with reference to the accompanying drawings.

In the following description, the same drawing reference numerals are used for the same elements even in different drawings. The matters defined in the description, such as detailed construction and elements, are provided to assist in a comprehensive understanding of the invention. Thus, it is apparent that the present invention can be carried out without those specifically defined matters. Also, well-known functions or constructions are not described in detail since they would obscure the invention with unnecessary detail.

FIG. 1 is a block diagram of a remote control and an image display apparatus according to an exemplary embodiment of the present invention. The remote control 100 includes a plurality of sensors 110-1 to 110-$n$, a control unit 120, an analog to digital converter (ADC) 130, and a transmission unit 140. The image display apparatus 200, which operates according to the control of the remote control 100, includes a reception unit 210, a calculation unit 220, a control unit 230, and a pointer 240. For convenience of explanation, the control unit 120 of the remote control 100 is referred to hereinbelow as the first control unit 120, and the control unit of 230 of the image display apparatus 200 is referred to hereinbelow as the second control unit 230.

The plurality of sensors 110-1 to 110-$n$ sense movement of the remote control 100. The sensors 110-1 to 110-$n$ may be implemented as two-axis or three-axis gyro sensors, two-axis or three-axis acceleration sensors, or as a combination of at least two sensors from among two-axis or three-axis gyro sensors, two-axis or three-axis acceleration sensors, and terrestrial magnetism sensors.

The first control unit 120 operates only the first sensor 110-1 from among the plurality of sensors 110-1 to 110-$n$ to receive a power supply. In more detail, the first control unit 120 transmits an impulse signal to the first sensor 110-1 at short intervals in order for the first sensor 110-1 to regularly sense movement of the remote control 100.

Figure 2:
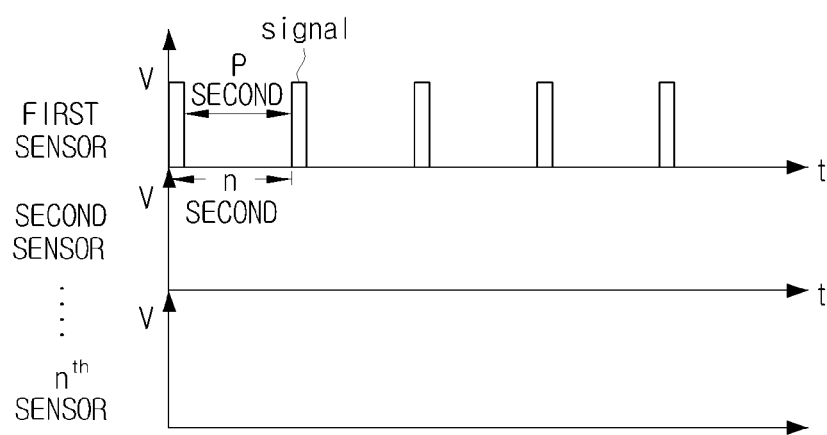
FIG. 2 is a mimetic diagram illustrating control of a sensor according to an exemplary embodiment of the present invention.

With reference to FIG. 2, the first control unit 120 generates an impulse signal for n-p seconds at n-second intervals, so that the first sensor 110-1 can regularly sense movement of the remote control 100. The second sensor 110-2 to the $n^{th}$ sensor 110-$n$ do not receive any signal. The first sensor 110-1 may be a gyro sensor.

If the first sensor 110-1 senses movement of the remote control 100, the first sensor 110-1 transmits a signal corresponding to the movement to the ADC 130.

If the ADC 130 receives signals corresponding to movement of the remote control 100 from the plurality of sensors 110-1 to 110-$n$, the ADC 130 converts the signals into digital signals which can be sensed by the first control unit 120. That is, the ADC 130 performs analog to digital conversion.

Signals output from the sensors 110-1 to 110-$n$ may be analog signals or digital signals according to the processing method of the sensors 110-1 to 110-$n$. If the sensors 110-1 to 110-$n$ output digital signals, analog to digital conversion is omitted.

Movement of the remote control 100 by the user and movement of the pointer according to movement of the remote control 100 are described with reference to FIG. 3.

Figure 3:
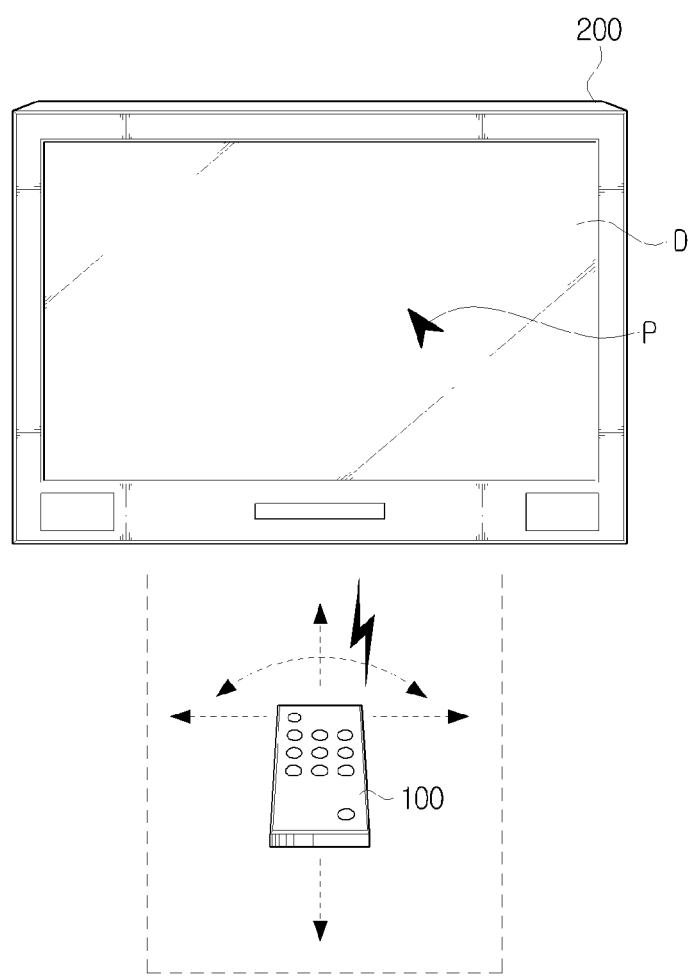
FIG. 3 is a mimetic diagram illustrating a method for controlling a pointer according to an exemplary embodiment of the present invention.

As shown with dotted arrows in FIG. 3, the user can move the front of the remote control 100 spatially. The front of the remote control 100 can move upwards, downwards, to the left, to the right, or in a direction combining two of these (for example, upwards and to the left). That is, the remote control 100 can move in any direction on a plane whereon the remote control 100 is placed.

For example, the front of the remote control 100 can form a trace on a virtual plane which is parallel to the display D of the image display apparatus.

The virtual plane and the display D may not be perfectly parallel to each other, and the virtual plane may not be perfectly flat. This is because, in reality, it is impossible for the front of the remote control 100 to move on a plane perfectly parallel to the display. In addition, if the user moves the front of the remote control 100 using his or her wrist, elbow, or finger, the front of the remote control 100 moves along a curved line. The variance of the curve and curvature vary according to the user.

Therefore, the present invention can be applied even when the front of the remote control 100 does not move perfectly parallel to the display D.

The user may move the front of the remote control 100 by holding his or her arm still while holding the remote control 100 and rotating his or her wrist.

That is, if the user rotates his or her wrist upwards, downwards, to the left, to the right, or in a direction combining two or more of these (for example, upwards and to the left), the front of the remote control 100 moves upwards, downwards, to the left, to the right, or in a direction combining two or more of these (for example, upwards and to the left) in a curved line.

If the first control unit 120 receives a digital signal of the first sensor 110-1 for the movement of the remote control 100 from the ADC 130, the first control unit 120 compares the level of the received signal with a reference signal. If the level of the received signal is higher than the reference signal, the first control unit 120 supplies power to the remaining sensors 110-2 to 110-n.

If the first control unit 120 receives no signals from any sensors during a certain time period after power is supplied to the plurality of sensors 110-1 to 110-n, the first control unit 120 supplies power only to the first sensor 110-1.

The transmission unit 140 converts the digital signal into a transmittable signal, and transmits the transmittable signal to the image display apparatus 100. The transmission unit 140 may be implemented, for example, as a radio frequency (RF) module, Zigbee, Bluetooth, or Infra-Red (IF).

When transmitting a digital signal regarding movement of the remote control 100 through the transmission unit 140, the first control unit 120 may attach a signal input using buttons on the remote control 100 and an additional signal such as channel information for high frequency transmission thereto. Signals transmitted to the image display apparatus 200 through the transmission unit 140 are referred to hereinbelow as sensor signals.

The buttons mounted on the remote control 100 include a power button, a channel button, a volume button, and a selection button.

The remote control 100 according to the present invention does not convert a signal regarding movement of the remote control 100 into a signal expressing coordinates, but converts the signal into a digital signal and transmits the digital signal, so power consumption for coordinate calculation is saved.

The image display apparatus 200 generates and provides a pointer 240 on the display (not shown). The user can control the setting menus displayed on the display of the image display apparatus 200 using the pointer 240.

The reception unit 210 receives a sensor signal corresponding to the movement of the remote control 100 from the remote control 100.

The calculation unit 220 calculates a motion vector of the remote control 100 using the received sensor signal. That is, movement variances of the remote control 100 along the X-axis and Y-axis are calculated by applying the received sensor signal to a pre-stored motion vector calculation algorithm.

The second control unit 230 moves the pointer 240 by the movement variances based on current coordinates (X, Y) of the pointer 240 in order to display the pointer 240. With reference to FIG. 3, the pointer P moves on the display D according to the spatial movement of the remote control 100. If the front of the remote control 100 moves spatially, the pointer P moves on the display D in the same direction as the front of the remote control 100 moves. The spatial movement of the front of the remote control 100 is distinct from the movement of a computer mouse moving on a surface.

Figure 4:
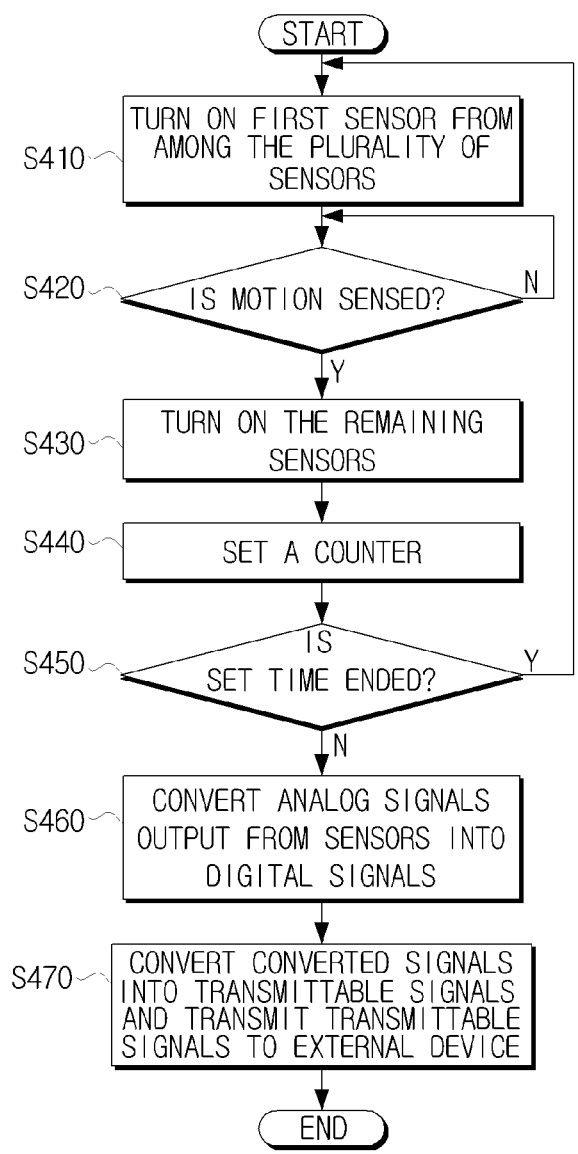
FIG. 4 is a flow chart of a method for controlling an image display apparatus using a remote control according to an exemplary embodiment of the present invention.

FIG. 4 is a flow chart of a method for controlling an image display apparatus using a remote control according to an exemplary embodiment of the present invention. More specifically, a method for controlling a remote control having a plurality of sensors for sensing the movement of the remote control 100 to control an external device is described. Firstly, in operation S410, the first sensor 110-1 from among the plurality of sensors 110-1 to 110-n is turned on to sense the movement of the remote control 100. In operation S420, the movement of the remote control 100 is sensed periodically by transmitting an impulse signal of a short period to the first sensor 110-1. The sensed signal is converted into a digital signal.

The sensors 110-1 to 110-n may be implemented as two-axis or three-axis gyro sensors, two-axis or three-axis acceleration sensors, or as a combination of at least two sensors from among two-axis or three-axis gyro sensors, two-axis or three-axis acceleration sensors, and terrestrial magnetism sensors. The first sensor may preferably be a gyro sensor.

In operation S430, if the first sensor senses the movement of the remote control 100, power is supplied to the remaining sensors 110-2 to 110-n. If the signal level output from the first sensor 110-1 is higher than the reference signal level, it is determined that the remote control 100 moves.

In operation S440, if the plurality of sensors 110-1 to 110-n are all turned on, a counter is set. The counter is set as n seconds, and if the movement of the remote control 100 is not sensed, the counter counts down by 1 second to be n−1 seconds. In operation S450, if the movement of the remote control 100 is not sensed during n seconds and the set counter reaches 0, power is supplied only to the first sensor 110-1, so that the first sensor 110-1 is turned on and the remaining sensors 110-2 to 110-n are turned off Alternatively, if the movement of the remote control 100 is sensed, the counter is not set.

In operation S460, if the plurality of sensors 110-1 to 110-n output signals regarding the movement of the remote control 100, the output signals are converted into digital signals.

The output signals may be analog signals or digital signals according to the processing method of the sensors 110-1 to 110-n. If the sensors 110-1 to 110-n output digital signals, analog to digital conversion is not needed.

In operation S470, the converted digital signal is converted into a transmittable signal and the transmittable signal is transmitted to the image display apparatus 200. When the digital signal regarding the movement of the remote control 100 is transmitted to the image display apparatus 200, a signal input using buttons on the remote control 100 or an additional signal such as channel information for high frequency transmission thereto may be attached thereto.

Figure 5:
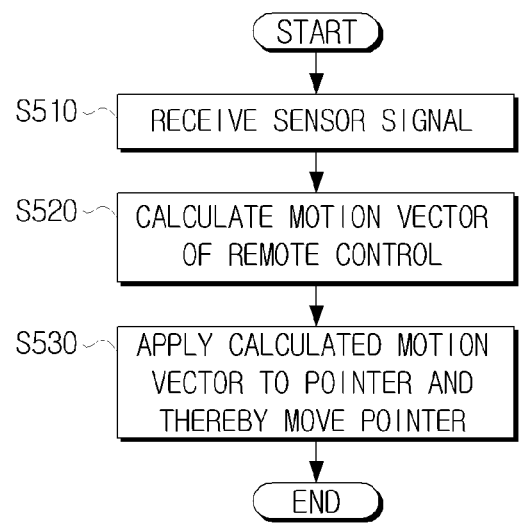
FIG. 5 is a flow chart of a method for controlling a pointer of an image display apparatus according to an exemplary embodiment of the present invention.

FIG. 5 is a flow chart of a method for controlling a pointer of an image display apparatus according to an exemplary embodiment of the present invention. The pointer is provided on the display, and the user can control the setting menus displayed on the display of the image display apparatus 200 using the pointer 240.

In operation S510, the image display apparatus 200 receives a sensor signal corresponding to the movement of the remote control 100 from the remote control 100.

In operation S520, the image display apparatus 200 calculates a motion vector of the remote control 100 using the received sensor signal. That is, movement variances of the remote control 100 on X-axis and Y-axis are calculated by applying the received sensor signal to a pre-stored motion vector calculation algorithm.

Subsequently, in operation S530, the pointer is moved and displayed using the movement variances based on the current coordinates (X, Y) of the pointer.

As can be appreciated from the above description, a remote control determines whether to turn on/off a plurality of sensors mounted in the remote control using one of the sensors, and transmits a signal output from the sensor to an image display apparatus without applying the signal to an algorithm so that battery consumption for sensing the movement of the remote control and applying the signal to the algorithm can be reduced.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A remote controller comprising:
a first movement sensor operable to sense a first movement parameter of the remote controller, the first movement sensor outputting a first signal if the first movement sensor senses the first movement parameter of the remote controller,
a second movement sensor operable to sense a second movement parameter of the remote controller,
a control unit operable to control the second movement sensor to be deactivated so that the second movement sensor is in a power consumption saving mode, and to output a second signal to re-activate the second movement sensor if the control unit receives the first signal output from the first movement sensor while the second movement sensor is deactivated, and
a transmission unit which transmits data regarding at least one of the sensed first movement parameter and the sensed second movement parameter of the remote controller to the image display apparatus to control a movement of a pointer displayed on an image display apparatus that is discrete from the remote controller.

2. The remote controller of claim 1, wherein the control unit re-activates the second movement sensor if the first signal output from the first movement sensor is higher than a reference signal.

3. The remote controller of claim 1, further comprising:
an analog to digital converter (ADC) which converts analog signals output from at least one of the first movement sensor and the second movement sensor into digital signals; and
a transmission unit which converts the converted digital signals into transmittable signals and transmits the transmittable signals.

4. The remote controller of claim 1, wherein the first movement sensor comprises at least one of a gyro sensor and an acceleration sensor, and the second movement sensor comprises a remaining one of the gyro sensor and the acceleration sensor.

5. A method for controlling a remote controller comprising a first movement sensor operable to sense a first movement parameter of the remote controller, and a second movement sensor operable to sense a second movement parameter of the remote controller, the first movement sensor outputting a first signal if the first movement sensor senses the first movement parameter of the remote controller the method comprising:
controlling the second movement sensor to be deactivated so that the second movement sensor is in a power consumption saving mode;
outputting a second signal to reactivate the second movement sensor if the first movement sensor outputs the first signal while the second movement sensor is deactivated; and
transmitting data regarding at least one of the sensed first movement parameter and the sensed second movement parameter of the remote controller to the image display apparatus to control a movement of a pointer displayed on the image display apparatus that is discrete from the remote controller.

6. The method of claim 5, wherein the outputting outputs the second signal if the first signal output from the first movement sensor is higher than a reference signal.

7. The method of claim 5, further comprising:
converting analog signals output from the at least one of the first movement sensor and the second movement sensor into digital signals; and
converting the digital signals into transmittable signals and transmitting the transmittable signals to the external device.

8. The method of claim 5, wherein the first movement sensor comprises at least one of a gyro sensor and an acceleration sensor, and the second movement sensor comprises a remaining one of the gyro sensor and the acceleration sensor.

9. An image display system comprising an image display apparatus and a remote control,
wherein the remote control comprises:
a first movement sensor operable to sense a first movement parameter of the remote controller, the first movement sensor outputting a first signal if the first movement sensor senses the first movement parameter of the remote controller;
a second movement sensor operable to sense a second movement parameter of the remote controller;
a control unit operable to control the second movement sensor to be deactivated so that the second movement sensor is in a power consumption saving mode, and to output a second signal to re-activate the second movement sensor if the control unit receives the first signal output from the first movement sensor while the second movement sensor is deactivated; and
a transmission unit which transmits data regarding at least one of the sensed first movement parameter and the sensed second movement parameter of the remote controller to the image display apparatus to control a movement of a pointer displayed on the image display apparatus that is discrete from the remote controller, and
wherein the image display apparatus comprises:
a display;

a reception unit which receives the data from the remote controller; and a control unit which calculates display position of the pointer to be displayed on the display using the received data.

10. A method of controlling an image display system including an image display apparatus and a remote controller, which includes a first movement sensor operable to sense a first movement parameter of the remote controller and a second movement sensor operable to sense a second movement parameter of the remote controller, the first movement sensor outputting a first signal if the first movement sensor senses the first movement parameter of the remote controller the method comprising:

controlling the second movement sensor to be deactivated so that the second movement sensor is in a power consumption saving mode;

outputting a second signal to re-activate the second movement sensor if the first movement sensor outputs the first signal while the second movement sensor is deactivated;

transmitting data regarding at least one of the sensed first movement parameter and the sensed second movement parameter of the remote controller to the image display apparatus to control a movement of a pointer displayed on the image display apparatus that is discrete from the remote controller; and calculating a display position of the pointer to be displayed on the image display apparatus using the received data.

11. The remote controller of claim 1, wherein the control unit controls the second movement sensor to be deactivated if the control unit does not receive the signal regarding the sensed first movement parameter of the remote controller from the first movement sensor and the signal regarding the sensed second movement parameter of the remote controller from the second movement sensor.

12. The remote controller of claim 1, wherein the transmission unit converts the data regarding the at least one of the sensed first movement parameter and the sensed second movement parameter of the remote controller to data for wireless transmission, and transmits the data for wireless transmission to the image display apparatus wirelessly.

13. The remote controller of claim 1, wherein the second movement sensor is re-activated by the second signal in the deactivated state and remains in the re-activated state until the second movement sensor is in the power consumption saving mode.

14. The method of claim 5, wherein the controlling the second movement sensor controls the second movement sensor to be deactivated if the first movement sensor does not output a signal regarding the sensed first movement parameter of the remote controller and the second movement sensor does not output a signal regarding the sensed second movement parameter of the remote controller.

15. The method of claim 5, wherein the transmitting converts the data regarding the at least one of the sensed first movement parameter and the sensed second movement parameter of the remote controller to data for wireless transmission, and transmits the data for wireless transmission to the image display apparatus wirelessly.

16. The method of claim 5, wherein the second movement sensor is re-activated by the second signal in the deactivated state and remains in the re-activated state until the second movement sensor is in the power consumption saving mode.

17. The image display system of claim 9, wherein the control unit of the remote control controls the second movement sensor to be deactivated if the control unit does not receive the signal regarding the sensed first movement parameter of the remote controller from the first movement sensor and the signal regarding the sensed second movement parameter of the remote controller from the second movement sensor.

18. The image display system claim 9, wherein the transmission unit of the remote control converts the data regarding the at least one of the sensed first movement parameter and the sensed second movement parameter of the remote controller to data for wireless transmission, and transmits the data for wireless transmission to the image display apparatus wirelessly.

19. The image display system of claim 9, wherein the second movement sensor is re-activated by the second signal in the deactivated state and remains in the re-activated state until the second movement sensor is in the power consumption saving mode.

20. The method of claim 10, wherein the controlling the second movement sensor controls the second movement sensor to be deactivated if the first movement sensor does not output a signal regarding the sensed first movement parameter of the remote controller and the second movement sensor does not output a signal regarding the sensed second movement parameter of the remote controller.

21. The method of claim 10, wherein the transmitting converts the data regarding the at least one of the sensed first movement parameter and the sensed second movement parameter of the remote controller to data for wireless transmission, and transmits the data for wireless transmission to the image display apparatus wirelessly.

22. The method of claim 10, wherein the second movement sensor is re-activated by the second signal in the deactivated state and remains in the re-activated state until the second movement sensor is in the power consumption saving mode.

* * * * *